United States Patent
Klimovitch (10) Patent No.: US 10,038,369 B2
(45) Date of Patent: Jul. 31, 2018

(54) SYSTEMS AND METHODS FOR REDUCING NOISE AND INTERFERENCE IN ISOLATED SWITCHING POWER SUPPLIES

(71) Applicant: Pacesetter, Inc., Sunnyvale, CA (US)

(72) Inventor: Gleb Klimovitch, Santa Clara, CA (US)

(73) Assignee: Pacesetter, Inc., Sunnyvale, CA (US)

( * ) Notice: Subject to any disclaimer, the term of this patent is extended or adjusted under 35 U.S.C. 154(b) by 392 days.

(21) Appl. No.: 14/946,571

(22) Filed: Nov. 19, 2015

(65) Prior Publication Data

US 2017/0149327 A1 May 25, 2017

(51) Int. Cl.
*H02M 1/44* (2007.01)
*H02M 1/12* (2006.01)
*H02M 3/335* (2006.01)

(52) U.S. Cl.
CPC .............. *H02M 1/44* (2013.01); *H02M 1/126* (2013.01); *H02M 3/335* (2013.01)

(58) Field of Classification Search
CPC .......... H02M 1/12; H02M 1/126; H02M 1/44; H02M 3/335; H02M 3/33523; H02M 3/337; H02M 3/3385
See application file for complete search history.

(56) References Cited

U.S. PATENT DOCUMENTS

| | | | |
|---|---|---|---|
| 5,781,077 A * | 7/1998 | Leitch | H01F 27/2885 329/315 |
| 6,490,181 B1 * | 12/2002 | Liu | B29C 45/76 363/40 |
| 9,065,348 B2 | 6/2015 | Wang et al. | |
| 2012/0109236 A1 * | 5/2012 | Jacobson | A61N 1/368 607/4 |
| 2014/0016371 A1 * | 1/2014 | Chandrasekaran | H01F 27/28 363/21.12 |
| 2014/0334195 A1 * | 11/2014 | Nussbaum | H02M 3/3376 363/21.04 |
| 2015/0036396 A1 * | 2/2015 | Klesyk | H02M 1/40 363/55 |
| 2017/0012548 A1 * | 1/2017 | Sakuno | H02M 1/44 |

* cited by examiner

*Primary Examiner* — Emily P Pham
*Assistant Examiner* — Shahzeb K Ahmad
(74) *Attorney, Agent, or Firm* — Theresa A. Raymer (57) ABSTRACT

The present disclosure provides systems and related methods for reducing noise and interference in communications between an external device and implantable medical devices. The external device comprises an isolated switching power supply that includes a transformer separating a non-isolated side from an isolated side of the power supply. The transformer includes a primary winding on the non-isolated side, the primary winding extending between a primary winding upper end and a primary winding lower end, and a secondary winding on the isolated side, the secondary winding extending between a secondary winding upper end and a secondary winding lower end. The power supply further includes a high-frequency switch configured to selectively connect and disconnect the primary winding lower end to a ground, wherein the primary winding is electrically coupled to a supply voltage at an intermediate point between the primary winding upper end and the primary winding lower end.

25 Claims, 9 Drawing Sheets

SYSTEMS AND METHODS FOR REDUCING NOISE AND INTERFERENCE IN ISOLATED SWITCHING POWER SUPPLIES

FIELD OF THE DISCLOSURE

The present disclosure relates generally to programmers for use with implantable medical devices, and more particularly to reducing noise and interference in isolated switching power supplies of programmers used to communicate with implantable medical devices.

BACKGROUND ART

Implantable medical devices (IMDs) such as pacemakers and implantable cardioverters/defibrillators (ICDs) typically have a non-rechargeable battery with an expected lifetime of 3-15 years, with 5-10 years being most common. This has been made possible with advancements in battery and capacitor technology, as well as reducing power requirements of the components within the device. At the same time, many more features, therapies and capabilities are provided in modern IMDs that simply require additional power.

Pacemakers generally require at least two electrodes to deliver electrical therapy to the heart and to sense the intracardiac electrogram. Traditionally, pacemaker systems are comprised of an implantable pulse generator and lead system. The pulse generators are implanted under the skin and connected to a lead system that is implanted inside the heart with at least one electrode touching the endocardium. The lead system can also be implanted on the epicardial surface of the heart.

Leadless pacemakers (LPMs) may also be used to deliver cardiac stimulation. In the case of intercommunication between a LPM that is configured to fit within a chamber of a patient's heart and a programmer, however, the power source of the LPM is heavily constrained due to patient anatomy and related safety issues. Any excess power consumption needed for implant to programmer ("i2p") communication will reduce device battery/power cell longevity of the implant, requiring the patient to undergo more frequent operations to have their implants replaced.

An implantable cardiac monitor (ICM) enables physicians to evaluate heart rhythm signals over a longer period of time than allowed by conventional monitoring, and is designed to help diagnose and document difficult-to-detect rhythm disorders in patients who may suffer from unexplained symptoms, including syncope (the sudden and transient loss of consciousness), palpitations and shortness of breath. An ICM may be implanted subcutaneously in the upper chest region and is approximately the size of a computer thumb drive, enabling delivery using an outpatient procedure, under local anesthesia, with little patient discomfort. The ICM communicates with a programmer, allowing real-time data to be remotely sent to a health care provider. However, because of the small size of the ICM, the size of the power source of the ICM is also heavily constrained.

Power management is a very important aspect in the design and manufacture of IMDs and, in particular, power management for efficient and reliable communication between a programmer and smaller IMDs, such as LPMs, ICMs, and other hemodynamic monitors, where power resources are especially scares.

In addition, IMD orientations and geometries may affect signal strength and therefore reliability of communication between the IMD and a programmer.

BRIEF SUMMARY OF THE DISCLOSURE

The present disclosure provides a programmer and method that are capable of fulfilling at least some of the above-mentioned needs or provide a solution to or alleviating at least some of the above-mentioned problems in the prior art.

A particular object of the present invention is to provide a programmer and a method for increasing signal-to-noise+interference ratio in communications between the programmer and an implantable medical device.

This and other objects of the present disclosure are achieved by means of a method and a programmer having the features defined in the independent claims. Different embodiments of the invention are characterized by the dependent claims.

According to an aspect of the present disclosure, there is provided, an isolated switching power supply that includes a transformer separating a non-isolated side of the power supply from an isolated side of the power supply, the transformer includes a primary winding on the non-isolated side, the primary winding extending between a primary winding upper end and a primary winding lower end, and a secondary winding on the isolated side, the secondary winding extending between a secondary winding upper end and a secondary winding lower end. The power supply further includes a ground, and a high-frequency switch configured to selectively connect and disconnect the primary winding lower end to the ground, wherein the primary winding is electrically coupled to a supply voltage at an intermediate point between the primary winding upper end and the primary winding lower end.

The present disclosure may be implemented in communications between a programmer and one or more implantable medical devices (IMDs). For example, the programmer may communicate with an implantable monitor, a pacemaker and/or implantable cardioverter/defibrillator (ICDs), such as a subcutaneous ICD.

The programmer includes a housing, and an isolated switching power supply positioned within the housing, the isolated switching power supply including a transformer separating a non-isolated side of the power supply from an isolated side of the power supply, the transformer including a primary winding on the non-isolated side, the primary winding extending between a primary winding upper end and a primary winding lower end, and a secondary winding on the isolated side, the secondary winding extending between a secondary winding upper end and a secondary winding lower end. The power supply further includes a ground, and a high-frequency switch configured to selectively connect and disconnect the primary winding lower end to the ground, wherein the primary winding is electrically coupled to a supply voltage at an intermediate point between the primary winding upper end and the primary winding lower end.

In another embodiment, the present disclosure is directed to a method of operating an isolated switching power supply that includes a transformer separating a non-isolated side of the power supply from an isolated side of the power supply, the transformer including a primary winding on the non-isolated side, the primary winding extending between a primary winding upper end and a primary winding lower end, and a secondary winding on the isolated side, the secondary winding extending between a secondary winding upper end and a secondary winding lower end. The method includes electrically coupling a supply voltage to the primary winding at an intermediate point between the primary winding upper end and the primary winding lower end, and selectively connecting and disconnecting the primary winding lower end to a ground using a high-frequency switch.

The foregoing and other aspects, features, details, utilities and advantages of the present disclosure will be apparent from reading the following description and claims, and from reviewing the accompanying drawings.

BRIEF DESCRIPTION OF THE DRAWINGS

Corresponding reference characters indicate corresponding parts throughout the several views of the drawings.

DETAILED DESCRIPTION OF THE DISCLOSURE

The systems and methods described herein provide an isolated switching power supply having a transformer that reduces a variation in common-mode potential of a primary winding during switching cycles by having different segments of the primary winding change their potentials in counter-phase to one another. Further, capacitive coupling between different parts of the primary and secondary windings may be modified such that common-mode current injection into the secondary winding due to interwinding capacitance is reduced, because constituents from different parts of the primary winding are injected in counter-phase. This reduces common-mode current injection into the secondary winding, thereby decreasing noise and interference.

The systems and methods described herein provide a programmer for communicating with one or more implantable medical devices (IMDs). The programmer includes a housing and an isolated switching power supply positioned within the housing that advantageously enables an IMD, such as a leadless pacemaker (LPM) or implantable cardiac monitor (ICM), to communicate with the programmer using a small signal by increasing the signal-to-noise+interference ratio of the system. In order for the programmer to successfully receive the communication from the IMD, the signal-to-noise+interference ratio must be adequate. The present disclosure advantageously increases longevity of the IMD and/or decreases the power source energy budget for communication between the implantable device and the programmer and/or increases possible IMD orientation and/or geometries for reliable communication, by reducing noise and interference in an isolated switching power supply of a programmer, thereby increasing the signal-to-noise+interference ratio.

Figure 1A:
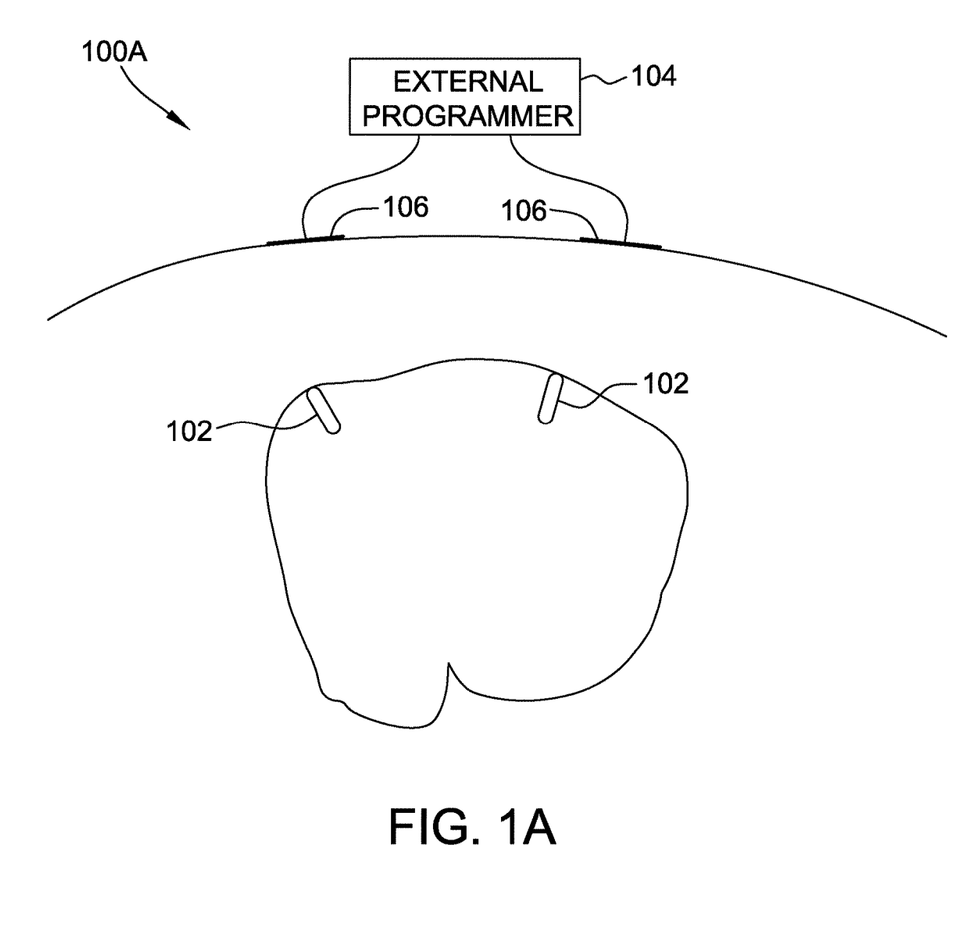
FIGS. 1A and 1B are schematic diagrams of embodiments of biostimulator systems.
Figure 1B:
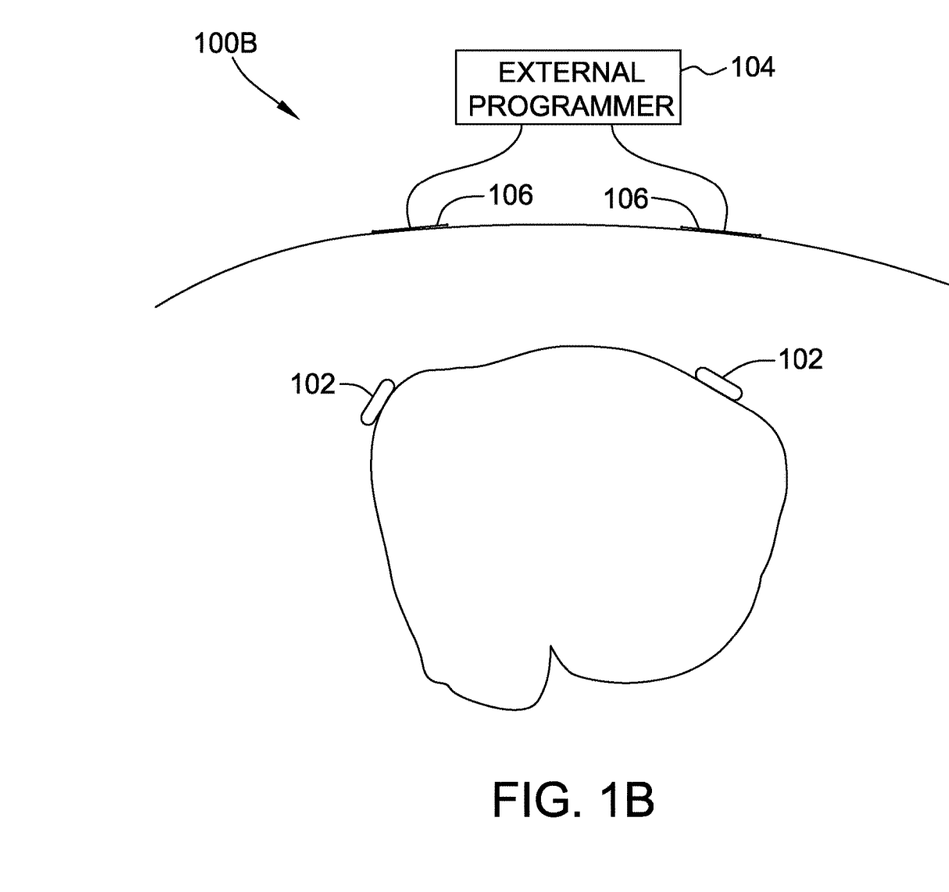

Referring to FIGS. 1A and 1B, schematic pictorial views depict embodiments of systems 100A, 100B that communicate via conductive communication. Systems 100A, 100B include one or more implantable medical devices (IMDs) 102 (e.g., one or more of a leadless cardiac pacemaker, implantable cardiac monitor, conventional cardiac pacemaker that includes a lead system, implantable defibrillator, subcutaneous implantable defibrillator, and sensor) and an external programmer 104 configured for communicating with the one or more IMDs 102 via bidirectional communication pathways that include a receiving pathway that decodes information encoded on stimulation pulses generated by one or more of the IMD 102 and conducted through body tissue to the external programmer 104.

In this embodiment, the bidirectional communication pathways can be configured for communication with multiple IMDs 102 via two or more electrodes 106 and conduction through body tissue.

In accordance with various system embodiments, external programmer 104 is connected by a communication transmission channel and has transmitting and receiving functional elements for a bidirectional exchange of information with one or more IMDs 102. The communication channel includes two or more electrodes 106 which can be affixed or secured to the surface of the skin. From the point of the skin, the communication transmission channel is wireless, includes the ion medium of the intra- and extra-cellular body liquids, and enables electrolytic-galvanic coupling between the surface electrodes and IMD 102.

In systems 100A, 100B, IMDs 102 may be leadless pacemakers and the bidirectional communication pathways can further include a transmitting pathway that passes information from the external programmer 104 to one or more of the IMDs 102 by direct conduction through the body tissue by modulation that avoids skeletal muscle stimulation using modulated signals at a frequency in a range from approximately 10 kHz to 100 kHz.

Information transmitted from external programmer 104 to IMDs 102 may be conveyed by modulated signals at the approximate range of 10 kHz to 100 kHz which is a medium-high frequency. The signals may be passed through the communication transmission channel by direct conduction. A modulated signal in the frequency range has a sufficiently high frequency to avoid any depolarization within the living body which would lead to activation of the skeletal muscles and discomfort to the patient. The frequency is also low enough to avoid causing problems with radiation, crosstalk, and excessive attenuation by body tissue. Thus, information may be communicated at any time, without regard to the heart cycle or other bodily processes.

In some embodiments, the bidirectional communication pathways can further include a receiving pathway including a low-pass filter adapted to separate the electrocardiogram from the information signals. The same surface electrodes 106 that are used to transmit the information through the communication channel may also be used to detect a patient's electrocardiogram. Electrocardiogram frequencies are generally between 1 and 100 Hz, far lower than the 10 kHz to 100 kHz range of frequencies used to transmit information through the communication transmission channel. Therefore, the electrocardiogram can be separated from the information signal by a low-pass filter and can optionally be displayed by external programmer 104. In addition to low-pass filtering, blanking techniques that are typical in processing of cardiac signals can be used when the communication channel is active to prevent noise or erroneous signals from the communication channel affecting the electrocardiogram channel.

Because a plurality of IMDs 102 may be present, communication of information from the programmer is detected by all devices, enabling information to be sent to each IMD without sending the same information multiple times.

In some embodiments, the one or more IMDs 102 can include one or more leadless cardiac pacemakers that generate pulses, e.g., cardiac pacing pulses, and encode information onto the generated pulses by selective alteration of pulse morphology. The pulses conduct into body tissue via the electrodes for antenna-less and telemetry coil-less communication. For information transmitted from IMD 102 to external programmer 104, a communication scheme can be used in which the information is encoded on the pulse. External programmer 104 receives the pulses through associated surface electrodes 106. Encoded information is drawn from the pulses and can contain state information of the IMD 102, such as battery voltage, lead impedance, sensed electrocardiogram amplitude, pacemaker current drain, programmed parameters, or other parameters.

External programmer 104 and associated operating methods or techniques enable presentation to the user of information gathered from IMD 102 using conductive communication. Some of the information to be presented may include battery voltage, lead impedance, electrocardiogram amplitude, or current drain of the device. The information can be presented in addition to other information such as parameters to be set and programmed into a leadless cardiac pacemaker, implantable cardiac monitor, etc. The information can be presented to a user on a display screen. Some embodiments or configurations of external programmer 104 can include a secondary link, for example either wireless or through a cable, to another display device, such as a handheld computer or terminal. The secondary link can also include communication over a local area network or the internet for display at a remote terminal.

FIG. 1A depicts a sample configuration involving external programmer 104 and two endocardially implanted IMDs (e.g., LPMs) 102. External programmer 104 is physically connected to the skin surface via two electrodes 106, which serve three functions. First, electrodes 106 transmit encoded information from external programmer 104 to implanted IMDs 102 using a modulated signal at a medium frequency 10 kHz to 100 kHz. Second, electrodes 106 receive information from individual IMDs (e.g., leadless cardiac pacemakers) 102 by detecting encoded information in the pulses of IMD 102. Third, electrodes 106 receive surface electrocardiogram for display and analysis by external programmer 104.

In FIG. 1A, two IMDs (e.g., LPMs) 102 are implanted endocardially. Thus, in system 100A or 100B an IMD 102 may include one or more leadless cardiac pacemakers that can be implanted adjacent to an inside or an outside wall of a cardiac chamber. Referring to FIG. 1B, a similar system is represented with a difference that the two IMDs 102 are implanted by affixing to the exterior surface of the heart. Electrodes 106 and external programmer 104 function similarly in arrangements shown in FIGS. 1A and 1B whether IMDs 102 are implanted endocardially or epicardially (on the external heart surface). No restriction is imposed that the IMD may be located anywhere within the human body. For example, a LPM may be implanted endocardially along with others implanted on the outer surface of the heart. An ICM or subcutaneous-ICD may be implanted subcutaneously in the upper chest region. A hemodynamic monitor may be implanted elsewhere in the human body, etc. The functioning of external programmer 104 is substantially the same.

Although two electrodes 106 are shown in FIGS. 1A and 1B, two is generally the minimum number for adequate conductive communication. More electrodes can be used, enabling an electrocardiogram (ECG) to be sensed at multiple vectors for better analysis. More than two electrodes also enable a choice of vectors for conducted communication with the leadless cardiac pacemakers, thereby maximizing the signal to noise ratio of the system. FIGS. 1A and 1B each depict two IMDs (e.g., leadless cardiac pacemakers) 102. One, two, or more leadless cardiac pacemakers and/or other IMDs can be implanted, depending on the number of IMDs appropriate for effective therapy. In addition, IMDs 102 may also one or more implantable cardiac monitors, conventional cardiac pacemakers, implantable defibrillators, subcutaneous implantable defibrillator, and/or sensors.

In various embodiments, external programmer 104 can be configured to perform one or more operations such as electrocardiogram sensing, retrieving status information from implanted pacemakers, modifying configuration parameters of multiple implanted pacemakers simultaneously in information passed through a common electrode set, displaying electrocardiograms, displaying information received from the at least one implantable device, and others.

In various embodiments, IMD 102 can manage power consumption to draw limited power from an internal battery, thereby reducing device volume. For example, IMD 102 may generate a relatively weak communication signal in order to conserve power.

IMDs 102 can encode and/or decode information using various techniques such as encoding the information using pulse width, binary-coded notches in a pulse, modulation of off-time between pulses, or other suitable encoding techniques.

Figure 2:
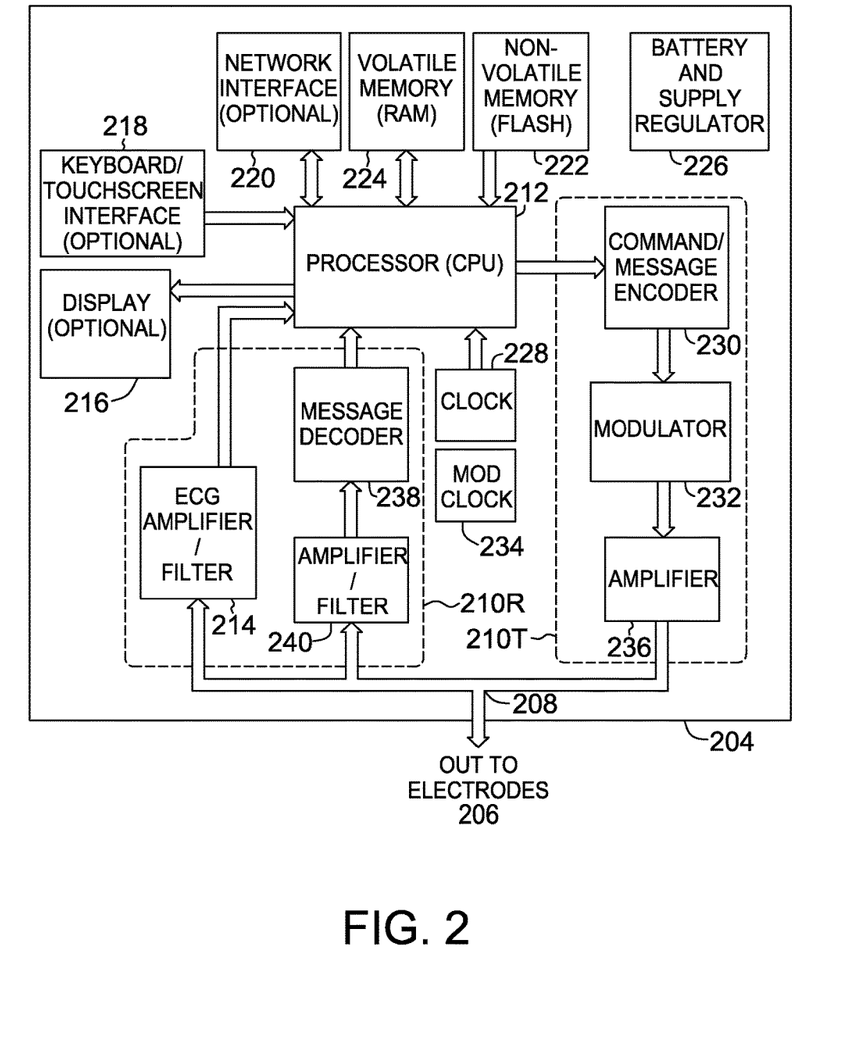
FIG. 2 is a block diagram of one embodiment of an external programmer that may be used with the biostimulator systems shown in FIGS. 1A and 1B.

Referring to FIG. 2, a schematic block diagram shows an embodiment of an external programmer 204 adapted for communicating with an implanted system, e.g., using conducted communication. External programmer 204 may be, for example, external programmer 104 (shown in FIG. 1). In this embodiment, external programmer 204 includes an interface 208 configured for coupling to at least two electrodes 206 that make electrical contact with body skin for communicating with one or more IMDs. External programmer 204 further includes bidirectional communication pathways 210R and 210T coupled to interface 208 and configured for bidirectional communication with the one or more IMDs. The communication pathways include a receiving pathway 210R that decodes information generated by the one or more IMDs.

Bidirectional communication pathways 210R and 210T are configured for communication with one or more IMDs via electrodes 206 and conduction through body tissue. In this embodiment, bidirectional communication pathways 210R and 210T further include a transmitting pathway 210T that passes information from external programmer 204 to one or more IMDs by conduction through the body tissue using modulation that avoids skeletal muscle stimulation.

In some arrangements, bidirectional communication pathways 210R and 210T can be further specified to include a transmitting pathway that passes information from external programmer 204 to the one or more IMDs, e.g., LPMs, by direct conduction using modulated signals at a frequency in a range from approximately 10 kHz to 100 kHz. Also in some arrangements, two or more electrodes 206 and bidirectional communication pathways 210R and 210T are configured for bidirectional information signal communication and for sensing an electrocardiogram.

Also in some embodiments, bidirectional communication pathways 210R and 210T can further include a transmitting pathway 210T that passes information from external programmer 204 to multiple IMDs in a common communication event. In some embodiments or selected operating conditions, transmitting pathway 210T can be arranged to pass information from external programmer 204 to multiple IMDs in a common communication event whereby information specific to a single implanted device or a subset of IMDs have a unique address assigned to the single implanted device or the subset of IMDs and encoded in the information. Transmitting pathway 210T can also be arranged to pass information from external programmer 204 to multiple IMDs in a common communication event whereby information designates a specific function that is executed by a particular implanted device or a particular subset of IMDs. The information is passed to the multiple IMDs without individual address information for activating execution by the particular implanted device or the particular subset of IMDs alone. Transmitting pathway 210T can also be arranged, either alone or in combination with other techniques, to pass information from external programmer 204 to multiple IMDs in a common communication event whereby information designates a specific function that is executed by a particular implanted device or a particular subset of IMDs that include programming specific to the function adapted to recognize the received information is relevant to the function.

In this embodiment, bidirectional communication pathways 210R and 210T include two or more electrodes 206 forming a conductive communication path between external programmer 204 and the skin surface, and transmitting pathway 210T. Transmitting pathway 210T includes a processor, or central processing unit (CPU) 212, a command/message encoder 230, a modulator 232, and an amplifier 236. CPU 212 is configured to communicate information to one or more implanted leadless cardiac pacemakers. Command/message encoder 230 is coupled to CPU 212 via a parallel interface and configured to encode and serialize data into a bit stream. Information encoding can be selected from encoding techniques such as on-off keying, frequency-shift keying, frequency modulation, and amplitude shift keying. Modulator 232 is coupled to command/message encoder 230 and receives and modulates the serialized data using a frequency in a range from approximately 10 kHz to approximately 100 kHz. Amplifier 236 is coupled to modulator 232 and increases signal amplitude to a level suitable for robust conducted communication.

Bidirectional communication pathways 210R and 210T further include receiving pathway 210R including a low-pass filter 214 adapted to separate the electrocardiogram from the information signals. In various embodiments, bidirectional communication pathways 210R and 210T further include a receiving pathway 210R that receives information at external programmer 204 from the one or more IMDs by conduction through the body tissue.

In this embodiment, bidirectional communication pathways 210R and 210T couple to two or more electrodes 206 forming a conductive communication path between external programmer 204 and the skin surface, and receiving pathway 210R. Receiving pathway 210R includes an electrocardiogram (ECG) amplifier/filter 214, an analog-to-digital converter (ADC) (not shown in FIG. 2), and CPU 212. Electrocardiogram (ECG) amplifier/filter 214 includes a differential band-pass amplifier configured to select and amplify signals in a frequency range from approximately 1 Hz to approximately 100 Hz. The analog-to-digital converter (ADC) is configured to digitize the filtered and amplified signal. CPU 212 is coupled to the ADC and configured to receive and optionally display ECG data, and configured to decode information encoded into cardiac pacing pulses.

External programmer 204 may further include CPU 212 coupled to the bidirectional communication pathways and configured to manage communication with one or more IMDs, for example leadless cardiac pacemakers. Leadless cardiac pacemakers can be implanted adjacent to an inside or an outside wall of a cardiac chamber as depicted in FIGS. 1A and 1B.

As depicted in FIG. 2, external electrodes 206 enable a conductive communication path between external programmer 204 and the skin surface. Electrocardiogram (ECG) signals enter ECG amplifier/filter 214, which can include a differential band-pass amplifier. In general, an ECG signal has spectral components in a range between 1 Hz and 100 Hz. Band-pass filter poles for the ECG amplifier/filter 214 can be selected such that sufficient signal energy is passed within the 1 Hz to 100 Hz range, while filtering other signals that are not associated with cardiac activity. The ECG signal can be amplified and digitized using an analog-to-digital converter (ADC). Once digitized, the signal is passed to the CPU 212.

In some embodiments, electrodes 206 may be implemented with more than two electrodes to enable an electrocardiogram (ECG) to be sensed at multiple vectors and further to enable selection from among the multiple vectors for conducted communication with implanted leadless cardiac pacemakers so that system signal-to-noise+interference ratio can be improved or maximized.

CPU 212 receives and optionally displays ECG data using a display interface 216 and can also display other data acquired from the implanted leadless cardiac pacemaker acquired through the encoded pacing pulses, such as battery voltage, lead impedance, sensed cardiac signal amplitude, or other system status information. CPU 212 also can accept input from a user via a keyboard and/or touch-screen interface 218. Some examples of user input are selected pacing rate or pacing pulse amplitude for implanted leadless cardiac pacemakers. CPU 212 can also communicate over a network interface 220 to other data entry or display units, such as a handheld computer or laptop/desktop unit. Network interface 220 can be cabled or wireless and can also enable communication to a local area network or the internet for greater connectivity.

CPU 212 is coupled to the bidirectional communication pathways and configured to perform one or more of various operations such as electrocardiogram sensing, retrieving status information from implanted pacemakers, modifying configuration parameters of multiple implanted pacemakers within a single or multiple cardiac cycles in information passed through a common electrode set, and other operations. Display interface 216 coupled to CPU 212 can be configured to display an electrocardiogram sensed from electrodes 206. In some arrangements or embodiments, network interface 220 can be coupled to CPU 212 and configured for unidirectional or bidirectional wireless or cable transmission to and/or from a remote display and/or data-entry device to display an electrocardiogram sensed from the at least two electrodes, and/or to control the programmer and/or at least one implanted device.

CPU 212 can execute operations based on firmware stored in non-volatile memory (Flash) 222. Non-volatile memory 222 can also be used to store parameters or values that are to be maintained when power is removed. CPU 212 uses volatile memory or random access memory (RAM) 224 as general storage for information such as ECG data, status information, swap memory, and other data. In an embodiment, battery and supply regulator 226 gives a constant voltage supply to external programmer 204 during normal operation. A clock module 228 generates a system clock signal used by CPU 212 and by interface blocks for timing.

CPU 212, during operation to communicate information to one or more IMDs, sends the information over a parallel interface to command/message encoder 230, which serializes the data into a bit stream. Serialized data is sent to a modulator 232. The serialized bit-stream is modulated, for example using a frequency between 10 kHz and 100 kHz. An optional separate modulator clock 234 supplies a timing signal at a selected carrier frequency that may be used by modulator 232. An amplifier 236 sets signal amplitude to a level that enables robust conducted communication.

In some embodiments, data acquired by external programmer 204 from a specific implanted device is received at surface electrodes 206 and passes to an amplifier/filter 240, which functions to remove noise from the incoming signal. Any filtering performed by amplifier/filter 240 is designed to leave encoded pulses intact as much as possible. A message decoder 238 determines whether the received signal is actually a pacing pulse or another signal, such as a cardiac R-wave.

As described above, battery and supply regulator 226 gives a constant voltage supply to external programmer 204 during normal operation. In certain embodiments, battery and supply regulator 226 include a power supply (described in further detail below). The power supply may be an isolated switching power supply (shown in FIGS. 3 and 4A-C). For example, the power supply may have a flyback topology. Notably, an isolated switching power supply may be prone to injecting common-mode current noise/interference into an isolated side of the power supply, as described below.

Figure 3:
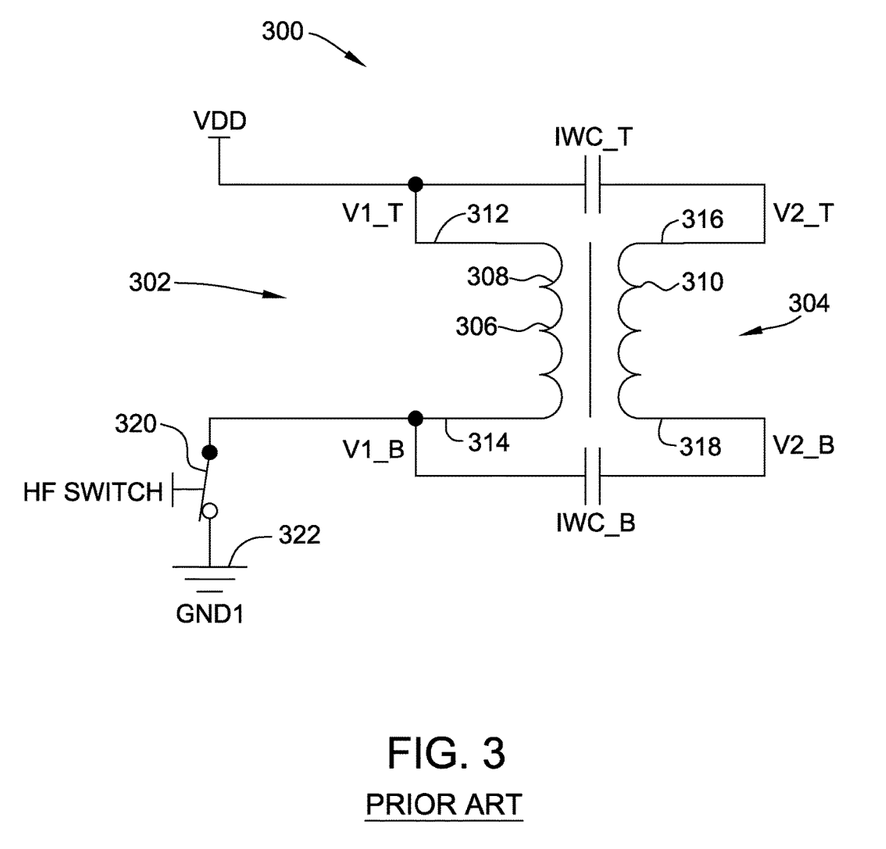
FIG. 3 is a circuit diagram of a known isolated switching power supply.

For example, FIG. 3 is a circuit diagram of a known isolated switching power supply 300. Power supply 300 includes a primary, non-isolated side 302 and a secondary, isolated side 304, with a transformer 306 separating primary side 302 and secondary side 304. Transformer 306 includes a primary winding 308 on primary side 302 and a secondary winding 310 on secondary side 304. Primary winding 308 includes an upper end 312 at a supply voltage VDD and a lower end 314 at a voltage V1_B, and secondary winding 310 includes an upper end 316 at a voltage V2_T and a lower end 318 at a voltage V2_B.

During operation, a high-frequency switch 320 (HF SWITCH) periodically connects and disconnects primary winding lower end 314 to a ground 322 (GND1). High-frequency switch 320 may be realized with an n-MOSFET transistor driven by a periodical square-wave control voltage. When high-frequency switch 320 disconnects primary winding lower end 314 from ground 322, a magnetic coupling between primary winding 308 and secondary winding 310 causes an essentially proportional transfer of the current in primary winding 308 into the current in secondary winding 310. The transferred current is rectified, low-pass filtered, and otherwise conditioned, in order to provide a proper voltage supply for secondary side 304. For clarity, rectification/filtering/conditioning circuitry is omitted in FIG. 3.

Primary winding upper end 312 is set at a primary side supply voltage, VDD. During a short part of the switching cycle, immediately after high-frequency switch 320 opens, a voltage (V1_B) at primary winding lower end 314 quickly jumps from essentially ground (i.e., 0 Volts) to several times VDD, and may oscillate between the two. Subsequently, V1_B gradually settles to a lower value V1_B_ON, where it stays until high-frequency switch 320 re-closes. Notably, the initial jump/oscillations in V1_B are due to leakage inductances in transformer 306.

Primary and secondary windings 308 and 310 are coupled through a parasitic capacitance between them. This capacitance causes the capacitive (displacement) current into secondary winding 310 when a voltage difference between primary and secondary windings 308 and 310 changes. The voltage difference depends on specific portions of primary and secondary windings 308 and 310 coupled through a fraction of interwinding capacitance (IWC), because, in general, there are nonzero voltages across primary and secondary windings 308 and 310.

The distributed IWC may be considered in two parts, without loss of generality: i) a first coupling capacitance, IWC_T, between primary winding upper end 312 and the entire secondary winding 310, and ii) a second coupling capacitance, IWC_B, between primary winding lower end 314 and the entire secondary winding 310. Accordingly, each part focuses on coupling between an end of primary winding 308 and the entire secondary winding 310. This is because there is less concern with the coupling distribution between a given section of primary winding 308 and different sections of secondary winding 310, and more of a focus on common-mode (not differential-mode) current injection into secondary winding 310. This is also because the voltage across secondary winding 310 stays relatively constant, except for a short period immediately after switching.

In isolated switching power supply 300, neither part of the IWC is introduced on purpose. Rather, these capacitances are considered parasitic side effects of transformer 306 (and to a lesser extent, the layout of other circuitry in isolated switching power supply 300). Further, as long as there is relatively negligible phase delay across primary and secondary windings 308 and 310, a quasi-static approximation holds for transformer 306, and the coupling between primary and secondary windings 308 and 310 can be reduced to first coupling capacitance IWC_T and second coupling capacitance IWC_B.

Shortly after high-frequency switch 320 opens and resulting fast transient voltages on primary winding 308 settle, V1_B changes from essentially zero (V1_B_OFF) to V1_B_ON, while the voltage across primary winding 308 (V1_) changes very little. As a result, the total charge injection from primary winding 308 into secondary winding 310 on the turn-on of high-frequency switch 320 is given by:

$$DQ\_ON = (V1\_B\_ON - V1\_B\_OFF)*(IWC\_B) \quad \text{Equation 1}$$

Soon after high-frequency switch 320 re-closes, V1_B changes back from V1_B_ON to essentially zero, while V1_ changes very little. As a result, the total charge injection from primary winding 308 into secondary winding 310 on the turn-off of high-frequency switch 320 is given by:

$$DQ\_OFF = (V1\_B\_OFF - V1\_B\_ON)*(IWC\_B) = -DQ\_ON \quad \text{Equation 2}$$

The common-mode injected current may be expressed in terms of a time derivative, d(V1_B_ON)/dt, of the primary voltage V1_B as:

$$I\_2CM = d(V1\_B)/dt * IWC\_B \qquad \text{Equation 3}$$

where it is taken into account that the primary side supply voltage, VDD, stays substantially constant over time. Accordingly, for isolated switching power supply 300, the relatively large changes in V1_B over time cause a relatively large injection of charge and current from primary winding 308 to secondary winding 310, which results is relatively large noise/interference.

The external programmer may include an isolated switching power supply. However, certain topologies of isolated switching power supplies, including flyback topology, may be prone to injecting common-mode current noise/interference into an isolated side. One channel of such injection results from capacitive coupling between primary secondary windings of a flyback transformer.

In at least some known flyback switching power supplies, during device operation strong changes occur in common-mode potential of the primary winding (relative to a non-isolated ground), because one end of the primary winding stays at approximately constant potential, while the other end of the primary winding quickly changes its potential. Thus, common-mode potential changes at the primary side couple to the secondary (isolated) side, thereby injecting common-mode current noise/interference into the secondary winding. This high-frequency (conductive) interference deteriorates reception of low-level signals at the secondary winding because it decreases a signal-to-noise+interference ratio.

The detrimental effects of such noise/interference can be partially mitigated by having a differential-mode signal receiver at the secondary winding. However, this mitigation is only partial, because any practical receiver suffers from some parasitic conversion of common- to differential-mode noise/interference (i.e., the receiver can only have a finite common-mode rejection ratio).

Figure 4A:
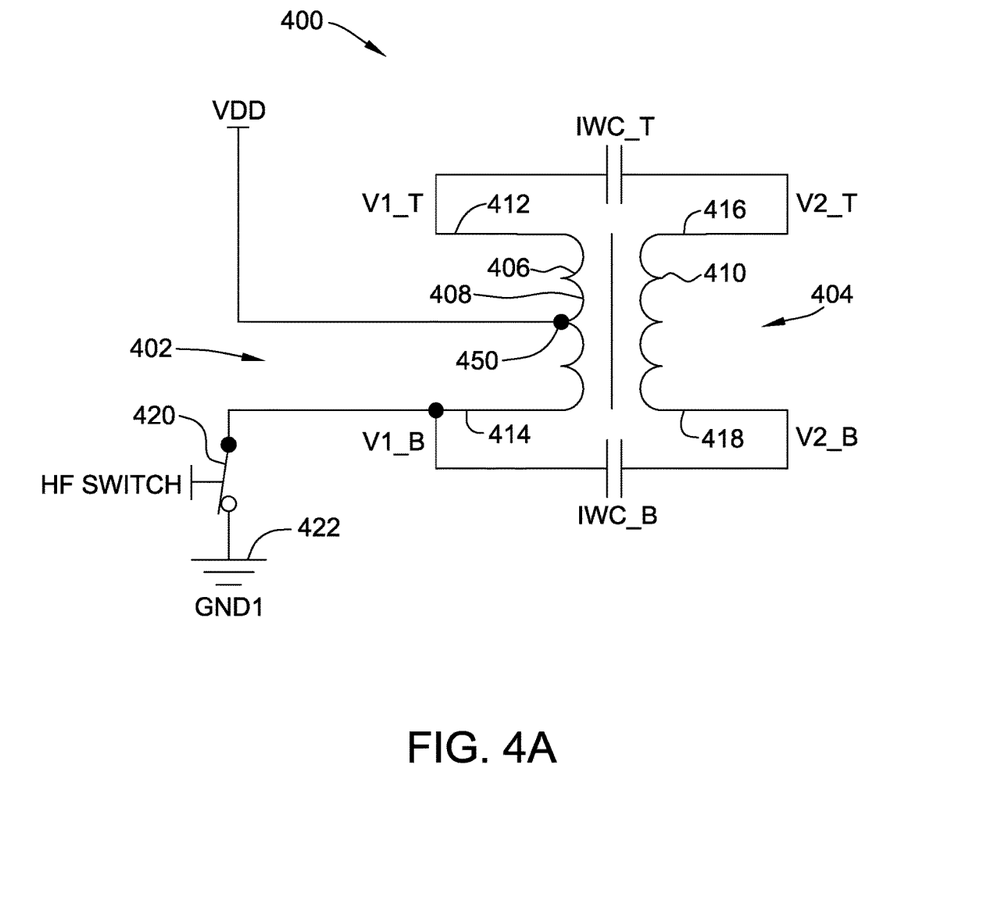
FIG. 4A is a circuit diagram of an embodiment of an isolated switching power supply according to the present disclosure.

FIG. 4A is a circuit diagram of one embodiment of an isolated switching power supply 400 in accordance with the present disclosure. In this embodiment, power supply operates in a continuous current mode. Similar to power supply 300, power supply 400 includes a primary, non-isolated side 402 and a secondary, isolated side 404, with a transformer 406 separating primary side 402 and secondary side 404. Transformer 406 includes a primary winding 408 on primary side 402 and a secondary winding 410 on secondary side 404. Primary winding 408 includes an upper end 412 at a voltage V1_T and a lower end 414 at a voltage V1_B, and secondary winding 410 includes an upper end 416 at a voltage V2_T and a lower end 418 at a voltage V2_B.

During operation, a high-frequency switch 420 (HF SWITCH) periodically connects and disconnects primary winding lower end 414 to a ground 422 (GND1). High-frequency switch 420 may be realized with an n-MOSFET transistor driven by a periodical square-wave control voltage.

In known power supply 300 (shown in FIG. 3), primary winding upper end 312 is connected directly to the supply voltage VDD. In contrast, in power supply 400, supply voltage VDD is not connected directly to primary winding upper end 412, but is instead connected at an intermediate point 450 on primary winding 408 between primary winding upper end 412 and primary winding lower end 414. This may be accomplished by using the same number of turns in primary winding 408 as in primary winding 308 and connecting VDD to a different point (i.e., intermediate point 450), or by including more turns in primary winding 408 than in primary winding 308 so that primary winding 408 becomes tapped (i.e., primary winding upper end 312 becomes intermediate point 450). Intermediate point 450 may be a midpoint between primary winding upper end 412 and primary winding lower end 414. Alternatively, intermediate point 450 may be any point on primary winding 408 between primary winding upper end 412 and primary winding lower end 414

Notably, during operation, substantially no current flows between intermediate point 450 and primary winding upper end 412. Instead the segment of primary winding 408 between intermediate point 450 and primary winding upper end 412 generates voltage V1_T that changes approximately in counter-phase with voltage V1_B. Further, the resulting displacement currents through IWC_T and IWC_B cancel each other.

That is, as with power supply 300, the distributed IWC for power supply 400 can be considered in two parts, without loss of generality: i) the first coupling capacitance, IWC_T, between primary winding upper end 412 and the entire secondary winding 410, and ii) the second coupling capacitance, IWC_B, between primary winding lower end 414 and the entire secondary winding 410.

Without loss of generality, assume that the winding geometry of primary winding 408 and secondary winding 410 is symmetric, such that IWC_T is approximately equal to IWC_B. Further, when intermediate point 450 is the midpoint, V1_T and V1_B change approximately in counter-phase relative to VDD. That is:

$$V1\_T - VDD \approx VDD - V1\_B \qquad \text{Equation 4}$$

Further, the total charge injection from primary winding 408 into secondary winding 410 on the turn-on of high-frequency switch 420 is given by:

$$DQ\_ON = (V1\_T\_OFF - V1\_T\_ON)*(IWC\_T) + (V1\_B\_ON - V1\_B\_OFF)*(IWC\_B) \qquad \text{Equation 5}$$

Soon after high-frequency switch 420 re-opens, V_B changes back from V1_B_ON to essentially zero, while V1_changes very little. As a result, the total charge injection from primary winding 408 into secondary winding 410 on the turn-off of high-frequency switch 420 is given by:

$$DQ\_OFF = -DQ\_ON \qquad \text{Equation 6}$$

and $$I\_2CM = d(V1\_T)/dt * IWC\_T + d(V1\_B)/dt * IWC\_B \qquad \text{Equation 7}$$

where d(V1_T)/dt and d(V1_B)/dt are time derivatives of V1_T and V1_B, respectively.

Due to Equation 4 and IWC_T being approximately equal to IWC_B, different constituents of injected current and charge almost cancel each other, dropping the resulting injected interference by a significant factor. For example, a peak of noise/interference spectral density may be reduced up to four times without IWC tuning, and up to one thousand times with IWC tuning (discussed below). Further, the average (i.e., not peak) in-band noise power may be reduced roughly two to three times.

In some embodiments, improved noise/interference reduction is achieved by modifying the parasitic capacitive coupling (i.e., IWC_T and IWC_B) between primary and secondary windings 408 and 410. This is referred to as IWC tuning. For example, to improve cancellation of counter-phase constituents into charge and current injection (per Equations 5-7) extra capacitance may be deliberately introduced in parallel with naturally occurring IWC by adding an explicit capacitor to the side where the capacitance is too low, thereby equalizing the capacitance of both the top half primary to secondary and bottom half primary to secondary. In an embodiment, an off-the-shelf capacitor, which may either be fixed or tunable (responsive to the level of noise/interference), is used. In another embodiment, a twisted wire capacitor is adjusted. This may result in a reduction of the maximal power spectral density of more than three orders of magnitude (i.e., more than a thousand times). The adjustments to parasitic capacitive coupling between primary and secondary windings 408 and 410 of isolated switching power supply 400 may be adjusted during manufacture of the isolated switching power supply 400, or may be adjusted dynamically during use of the programmer, as described further below.

Figure 4B:
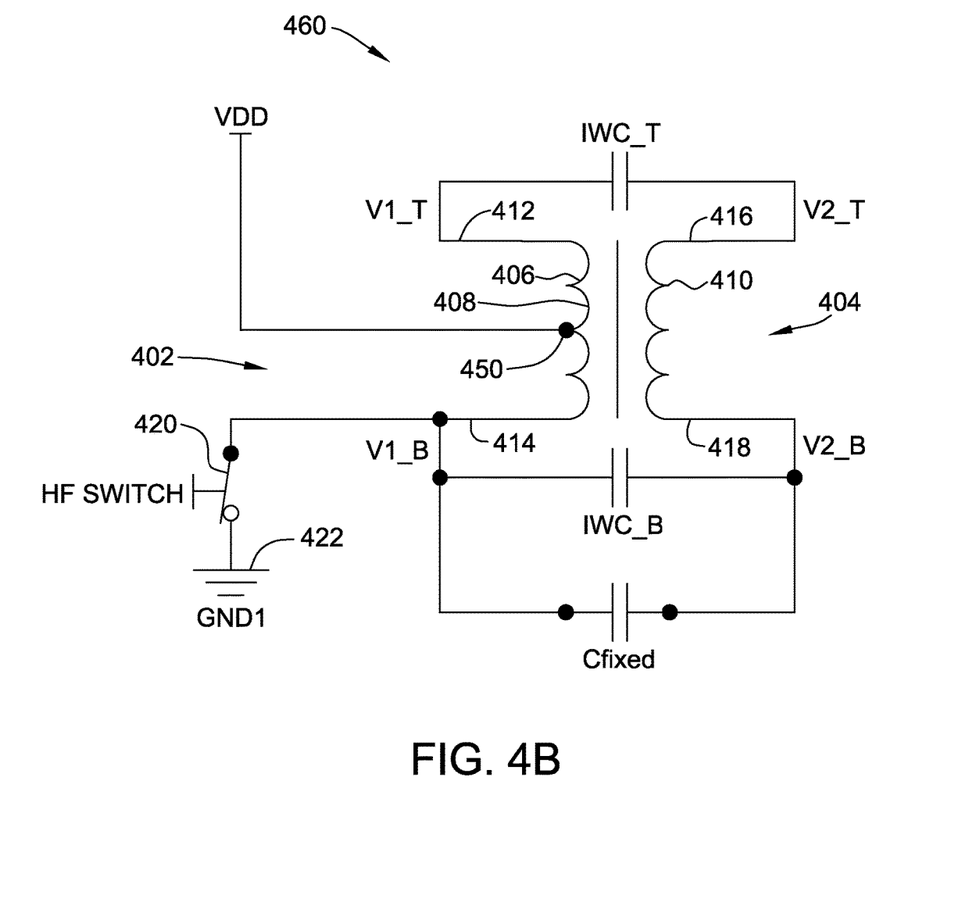
FIG. 4B is a circuit diagram of an embodiment of an isolated switching power supply according to the present disclosure.

FIG. 4B is a circuit diagram of one embodiment of an isolated switching power supply 460 in accordance with the present disclosure. Similar to power supply 400, power supply 460 includes a primary, non-isolated side 402 and a secondary, isolated side 404, with a transformer 406 separating primary side 402 and secondary side 404. Transformer 406 includes a primary winding 408 on primary side 402 and a secondary winding 410 on secondary side 404. Primary winding 408 includes an upper end 412 at a voltage V1_T and a lower end 414 at a voltage V1_B, and secondary winding 410 includes an upper end 416 at a voltage V2_T and a lower end 418 at a voltage V2_B.

During operation, a high-frequency switch 420 (HF SWITCH) periodically connects and disconnects primary winding lower end 414 to a ground 422 (GND1). High-frequency switch 420 may be realized with an n-MOSFET transistor driven by a periodical square-wave control voltage.

Like power supply 400, supply voltage VDD is not connected directly to primary winding upper end 412, but is instead connected at an intermediate point 450 on primary winding 408 between primary winding upper end 412 and primary winding lower end 414. Intermediate point 450 may be a midpoint between primary winding upper end 412 and primary winding lower end 414. Alternatively, intermediate point 450 may be any point on primary winding 408 between primary winding upper end 412 and primary winding lower end 414

In this embodiment, a fixed-capacitor (Cfixed) is added in during manufacture of isolated switching power supply 460 in order to equalize parasitic capacitance couplings IWC_T (between primary winding upper end 412 and the entire secondary winding) and IWC_B (between primary winding lower end 414 and the entire secondary winding 410). It is assumed in this embodiment, without loss of generality, that IWC_B is smaller than IWC_T, so that capacitance (Cfixed) is added at the bottom (to IWC_B), in order to improve noise cancellation.

Figure 4C:
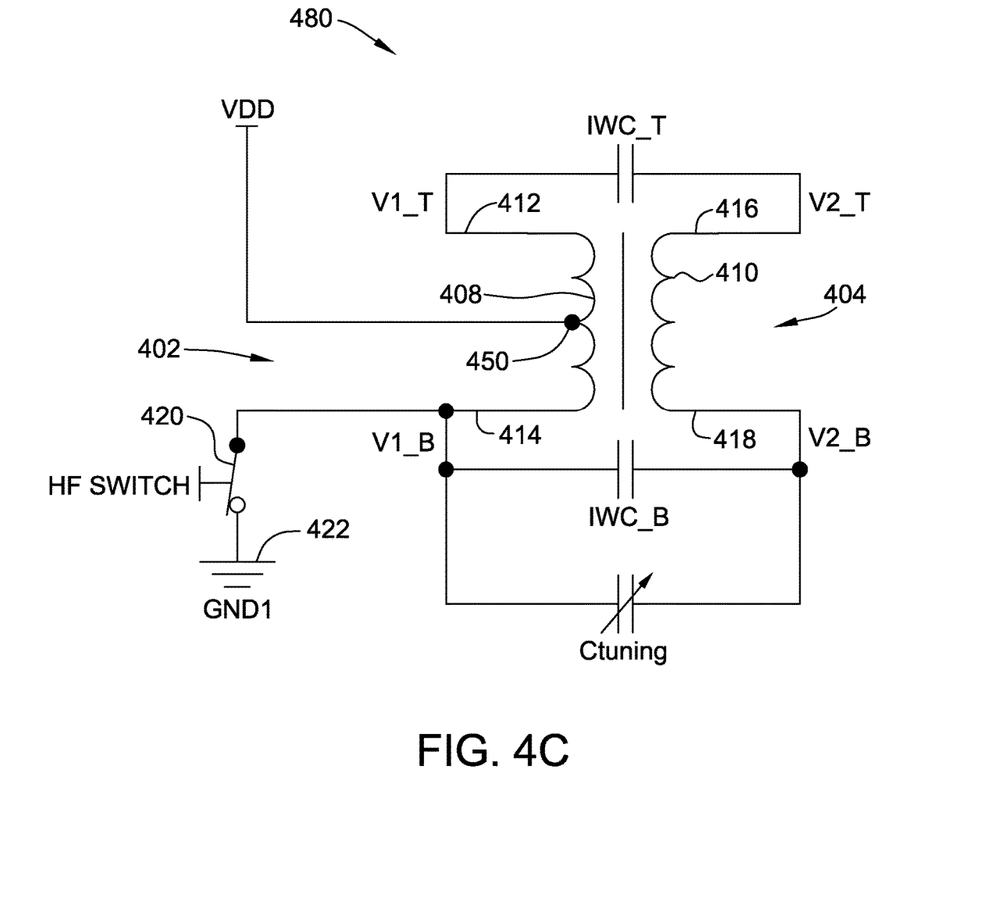
FIG. 4C is a circuit diagram of an embodiment of an isolated switching power supply according to the present disclosure.

FIG. 4C is a circuit diagram of one embodiment of an isolated switching power supply 480 in accordance with the present disclosure. Isolated switching power supply 480 is similar to isolated switching power supply 400, except that, in this embodiment, a variable-capacitor (Cvariable) is added in order to equalize couplings top-half-of-primary-to-secondary IWC_T (between primary winding upper end 412 and the entire secondary winding) and bottom-half-of-primary-to-secondary IWC_B (between primary winding lower end 414 and the entire secondary winding 410). It is assumed in this embodiment, without loss of generality, that IWC_B was initially smaller than IWC_T, and that Cvariable is added at the bottom (to IWC_B), in order to improve noise cancellation. Cvariable could be a twisted capacitor or could be a capacitor that is added or subtracted dynamically from the system using a switch. CPU 212 of external programmer 204 (both shown in FIG. 2) may be programmed to add and subtract Cvariable (as described in further detail below), e.g., using a switch, in order to dynamically modify parasitic capacitive coupling (i.e., IWC_T and IWC_B) between primary and secondary windings 408 and 410.

In another example, other circuit elements may be introduced (e.g., one or more resistors in series with a tuning capacitor) to improve an amplitude and phase balance between counter-phase constituents into charge and current injection.

In yet another example, because the segment of primary winding 408 between intermediate point 450 and primary winding upper end 412 conducts virtually no current, this segment may be composed of less expensive and/or less bulky material. However, symmetric building and placement of primary and secondary windings 408 and 410 makes it easier to achieve IWC_T approximately equal to IWC_B, and therefore strong reduction in injected interference, even in the absence of IWC tuning.

In addition to embodiments utilizing static tuning, in some embodiment, dynamic tuning is utilized. In such embodiments, the tuning capacitance may be varied depending on a measured or estimated level of common-mode noise injected by the switching power supply. For example, a stepwise variation in tuning capacitance may be achieved by switching one or several capacitors in and out of a capacitive network to affect the tuning capacitance. In another example, a quasi-continuous variation is implemented by using a voltage-controlled variable capacitor or capacitors within such a network.

Figure 5:
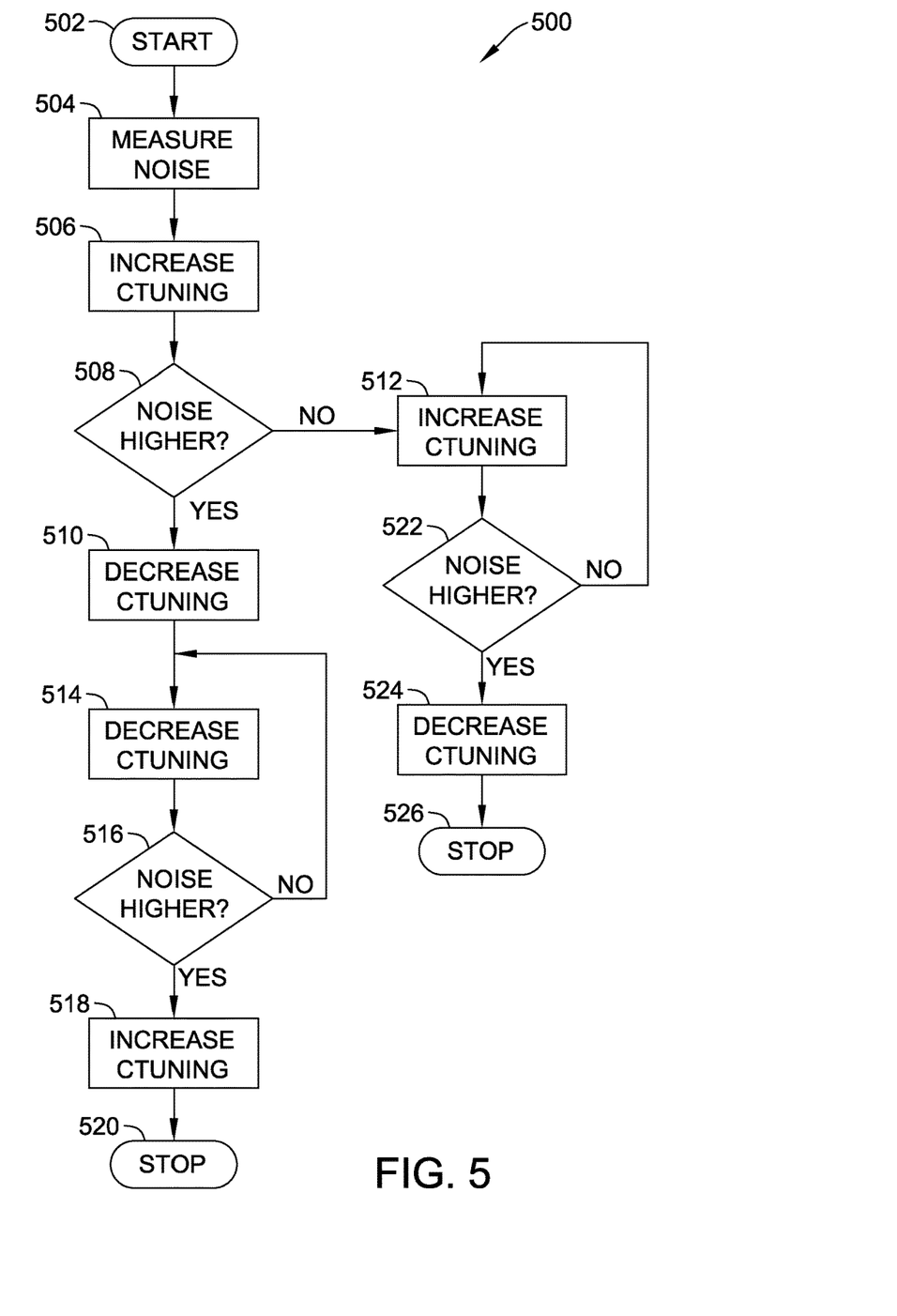
FIG. 5 is a flowchart of an embodiment of a method for interwinding capacitance (IWC) tuning that may be used with the isolated switching power supply shown in FIG. 4C.

FIG. 5 is a flowchart of one embodiment of a method 500 for IWC tuning. In this embodiment, increasing and decreasing "Ctuning" refers to increasing and decreasing the tuning capacitance by an equal and predetermined amount. Alternatively, the tuning capacitance may be incremented and/or decremented by any suitable value. Method 500 may be implemented, for example using CPU 212 of external programmer 204 (both shown in FIG. 2). Method 500 may also be implemented during the manufacture of the switching power supply.

Method initiates at block 502. At block 504, a current noise level is measured. Then, at block 506, the tuning capacitance is increased, by e.g., adding Cfixed or Cvariable (as described with respect to FIGS. 4B and 4C) to either IWC_T (if IWC_B was initially larger than IWC_T) or IWC_B (if IWC_B was initially smaller than IWC_T). At block 508, the current noise is measured, and it is determined whether the current noise resulting from the increased tuning capacitance is higher than the most recent previous noise measurement (i.e., the noise measured at block 504). If the noise is higher, flow proceeds to block 510. If the current noise is not higher, flow proceeds to block 512.

At block 510, the tuning capacitance is decreased, by e.g., reducing Cfixed or Cvariable, and flow proceeds to block 514, where the tuning capacitance is decreased again (such that the tuning capacitance is now lower than it was at the beginning of method 500). At block 516, the current noise is measured, and it is determined whether the current noise resulting from the decreased tuning capacitance is higher than the most recent previous noise measurement (i.e., the noise measured at block 508). If the current noise is not higher, flow returns to block 514, and the tuning capacitance is decreased again. If the current noise is higher, flow proceeds to block 518, where the tuning capacitance is increased, before method 500 ends at block 520.

At block 512, the tuning capacitance is increased, and flow proceeds to block 522. At block 522, the current noise is measured, and it is determined whether the current noise resulting from the increased tuning capacitance is higher than the most recent previous noise measurement (i.e., the noise measured at block 508). If the current noise is not higher, flow returns to block 512, and the tuning capacitance is increased again. If the current noise is higher, flow proceeds to block 524, where the tuning capacitance is decreased, before method 500 ends at block 526.

Figure 6:
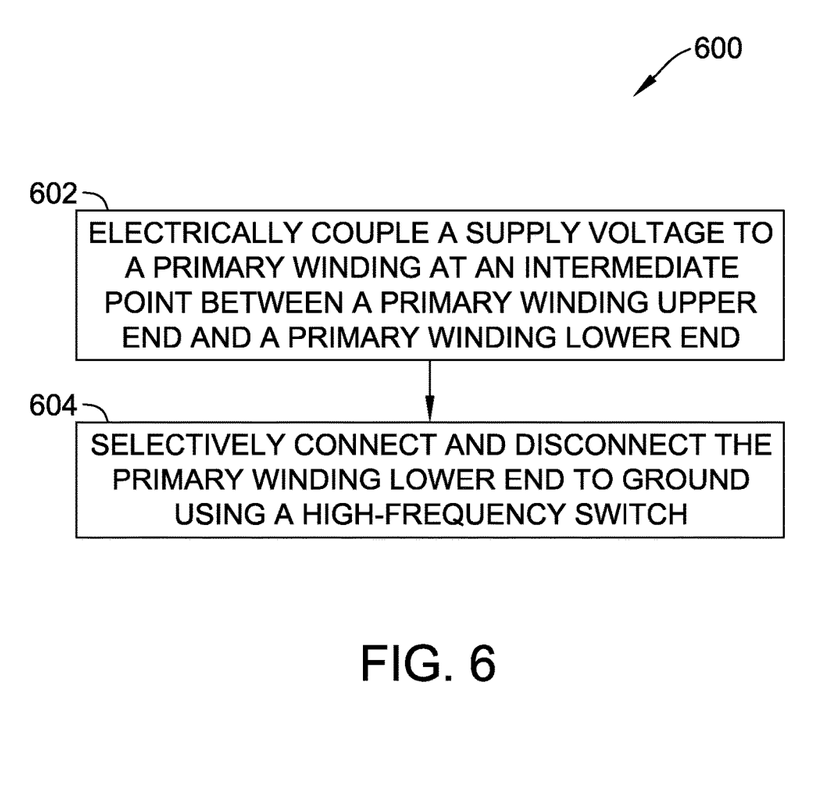
FIG. 6 is a flowchart of an embodiment of a method of operating the isolated switching power supply shown in FIGS. 4A, 4B, and 4C.

FIG. 6 is a flowchart of one embodiment of a method 600 of operating an isolated switching power supply, such as power supply 400 (shown in FIG. 4). The power supply includes a transformer separating a non-isolated side of the power supply from an isolated side of the power supply, the transformer including a primary winding on the non-isolated side. The primary winding extends between a primary winding upper end and a primary winding lower end. The power supply also includes a secondary winding on the isolated side, the secondary winding extending between a secondary winding upper end and a secondary winding lower end.

Method 600 includes, at block 602, electrically coupling a supply voltage to the primary winding at an intermediate point between the primary winding upper end and the primary winding lower end. In certain embodiments, the supply voltage is electrically coupled to the primary winding at an intermediate point between the primary winding upper end and the primary winding lower end statistically, during manufacture of the programmer. Method 600 further includes, at block 604, selectively connecting and disconnecting the primary winding lower end to a ground using a high-frequency switch, which may be implemented dynamically using CPU 212 of programmer 204 (both shown in FIG. 2) during operation of programmer 204.

The systems and methods described herein facilitate reducing noise/interference in an isolated switching power supply. When the power supply is used in a device communicating with an IMD, such as in communication between a programmer and an LPM or ICD, the reduction in noise/interference enables improved detection of small signals received by a programmer from the IMD. This allows for more robust communication and a wider range of possible IMD orientations and geometries for which communication between the IMD and the programmer will remain reliable. This also permits an IMD to generate communication signals using less power, as smaller communication signals may be received and decoded by the programmer.

Although certain embodiments of this disclosure have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. An isolated switching power supply comprising:
   a transformer separating a non-isolated side of the power supply from an isolated side of the power supply, the transformer comprising:
      a primary winding on the non-isolated side, the primary winding extending between a primary winding upper end and a primary winding lower end; and
      a secondary winding on the isolated side, the secondary winding extending between a secondary winding upper end and a secondary winding lower end;
   a ground; and
   a high-frequency switch configured to selectively connect and disconnect the primary winding lower end to the ground,
   wherein an intermediate point of the primary winding, which is between the primary winding upper end and the primary winding lower end, is electrically coupled to a supply voltage; and
   wherein the primary winding upper end is a floating non-grounded end of the primary winding and substantially no current flows between the intermediate point and the primary winding upper end.

2. The isolated switching power supply of claim 1, wherein the intermediate point is a midpoint between the primary winding upper end and the primary winding lower end.

3. The isolated switching power supply of claim 1, wherein the primary winding comprises:
   a first segment extending between the primary winding upper end and the intermediate point; and
   a second segment extending between the intermediate point and the primary winding lower end, wherein the first segment is made from a different material than the second segment.

4. The isolated switching power supply of claim 1, wherein the transformer further comprises an explicit capacitor connected to modify parasitic capacitive coupling between the primary winding and the secondary winding.

5. The isolated switching power supply of claim 4, wherein the explicit capacitor is a variable-capacitor.

6. The isolated switching power supply of claim 1, wherein operation of the isolated switching power supply results in a first parasitic capacitive coupling IWC_T between the primary winding upper end and the secondary winding and a second parasitic capacitive coupling IWC_B between the primary winding lower end and the secondary winding, wherein the transformer further includes one or more explicit capacitors connected in parallel with at least one of the first and second parasitic capacitive couplings to equalize the first parasitic capacitive coupling IWC_T and the second parasitic capacitive coupling IWC_B during operation.

7. The isolated switching power supply of claim 6, wherein the transformer further includes a resistor connected in series with the one or more explicit capacitor to at least one of reduce a difference in amplitude and phase between the first parasitic capacitive coupling IWC_T and the second parasitic capacitive coupling IWC_B during operation.

8. The isolated switching power supply of claim 1, wherein the transformer is configured to change a first voltage at the primary winding upper end approximately in counter-phase with a second voltage at the primary winding lower end.

9. The isolated switching power supply of claim 1, wherein during operation of the isolated switching power supply:
 a lower segment of the primary winding, which extends between the intermediate point and the primary winding lower end, generates a first voltage; and
 an upper segment of the primary winding, which extends between the intermediate point and the primary winding upper end, generates a second voltage that is approximately in counter-phase with the first voltage, thereby causing displacement currents through first and second parasitic capacitances of the transformer to substantially cancel each other.

10. The isolated switching power supply of claim 9, wherein during operation of the isolated switching power supply:
 the first parasitic capacitance of the transformer is between the primary winding upper end and the secondary winding; and
 the second parasitic capacitance of the transformer is between the primary winding lower end and the secondary winding.

11. A programmer for communicating with an implantable medical device (IMD), the programmer comprising:
 a housing; and
 an isolated switching power supply positioned within the housing, the isolated switching power supply comprising:
  a transformer separating a non-isolated side of the power supply from an isolated side of the power supply, the transformer comprising:
   a primary winding on the non-isolated side, the primary winding extending between a primary winding upper end and a primary winding lower end; and
   a secondary winding on the isolated side, the secondary winding extending between a secondary winding upper end and a secondary winding lower end;
  a ground; and
  a high-frequency switch configured to selectively connect and disconnect the primary winding lower end to the ground,
  wherein an intermediate point of the primary winding, which is between the primary winding upper end and the primary winding lower end, is electrically coupled to a supply voltage; and
  wherein the primary winding upper end is a floating non-grounded end of the primary winding and substantially no current flows between the intermediate point and the primary winding upper end.

12. The programmer of claim 11, wherein the intermediate point is a midpoint between the primary winding upper end and the primary winding lower end.

13. The programmer of claim 11, wherein the primary winding comprises:
 a first segment extending between the primary winding upper end and the intermediate point; and
 a second segment extending between the intermediate point and the primary winding lower end, wherein the first segment is made from a different material than the second segment.

14. The programmer of claim 11, wherein the programmer is configured to communicate with a leadless pacemaker.

15. The programmer of claim 11, wherein the transformer is configured to change a first voltage at the primary winding upper end approximately in counter-phase with a second voltage at the primary winding lower end during operation of the programmer.

16. The programmer of claim 11, further comprising a microprocessor configured to modifying the parasitic a capacitive coupling between the primary winding and the secondary winding.

17. The programmer of claim 11, wherein the transformer further comprises at least one of a fixed-capacitor and variable-capacitor between at least one of:
 the primary winding upper end and the secondary winding, and
 the primary winding lower end and the secondary winding.

18. The programmer of claim 11, wherein during operation of the isolated switching power supply:
 a lower segment of the primary winding, which extends between the intermediate point and the primary winding lower end, generates a first voltage; and
 an upper segment of the primary winding, which extends between the intermediate point and the primary winding upper end, generates a second voltage that is approximately in counter-phase with the first voltage, thereby causing displacement currents through first and second parasitic capacitances of the transformer to substantially cancel each other.

19. The programmer of claim 18, wherein during operation of the isolated switching power supply:
 the first parasitic capacitance of the transformer is between the primary winding upper end and the secondary winding; and
 the second parasitic capacitance of the transformer is between the primary winding lower end and the secondary winding.

20. A method of reducing at least one of noise and interference in communication between an external device and an implantable medical device (IMD), the external device comprising an isolated switching power supply that includes a transformer separating a non-isolated side of the power supply from an isolated side of the power supply, the transformer including a primary winding on the non-isolated side, the primary winding extending between a primary winding upper end and a primary winding lower end, and a secondary winding on the isolated side, the secondary winding extending between a secondary winding upper end and a secondary winding lower end, the method comprising:
 electrically coupling a supply voltage to the primary winding at an intermediate point between the primary winding upper end and the primary winding lower end;

leaving the primary winding upper end floating and non-grounded so that substantially no current flows between the intermediate point and the primary winding upper end; and selectively connecting and disconnecting the primary winding lower end to a ground using a high-frequency switch.

21. The method of claim 20, wherein selectively connecting and disconnecting the primary winding lower end causes a first voltage at the primary winding upper end to change approximately in counter-phase with a second voltage at the primary winding lower end.

22. The method of claim 20, wherein electrically coupling a supply voltage comprises electrically coupling the supply voltage to a midpoint between the primary winding upper end and the primary winding lower end.

23. The method of claim 20, further comprising introducing additional capacitance in parallel with an interwinding capacitance between the primary and secondary windings.

24. The method of claim 20, further comprising adjusting a tuning capacitance of the isolated switching power supply to facilitate reducing noise.

25. The method claim 20, further comprising during operation of the isolated switching power supply:

generating a first voltage across a lower segment of the primary winding extending between the intermediate point and the primary winding lower end; and generating a second voltage, which is approximately in counter-phase with the first voltage, across an upper segment of the primary winding extending between the intermediate point and the primary winding upper end, and thereby causing displacement currents through first and second parasitic capacitances of the transformer to substantially cancel each other.

* * * * *